United States Patent
Salkintzis et al.

(10) Patent No.: US 9,485,793 B2
(45) Date of Patent: Nov. 1, 2016

(54) METHOD, APPARATUS AND SYSTEM FOR TRIGGERING WIRELESS COMMUNICATION DEVICES TO ATTACH TO A WIRELESS COMMUNICATIONS NETWORK

(71) Applicant: Motorola Mobility LLC, Libertyville, IL (US)

(72) Inventors: Apostolis K. Salkintzis, Athens (GR); Howard P. Benn, Swindon (GB); Jian Jun Wu, Reading (GB)

(73) Assignee: Google Technology Holdings LLC, Mountain View, CA (US)

( * ) Notice: Subject to any disclaimer, the term of this patent is extended or adjusted under 35 U.S.C. 154(b) by 776 days.

(21) Appl. No.: 13/851,665

(22) Filed: Mar. 27, 2013

(65) Prior Publication Data

US 2013/0265953 A1 Oct. 10, 2013

Related U.S. Application Data

(60) Provisional application No. 61/622,100, filed on Apr. 10, 2012.

(51) Int. Cl.
*H04W 76/02* (2009.01)
*H04W 4/00* (2009.01)
(Continued)

(52) U.S. Cl.
CPC .......... *H04W 76/022* (2013.01); *H04W 4/005* (2013.01); *H04W 60/04* (2013.01); *H04W 76/02* (2013.01); *H04W 8/186* (2013.01)

(58) Field of Classification Search
CPC . H04W 76/022; H04W 4/005; H04W 76/02; H04W 60/04; H04W 8/186; H04W 74/006; H04W 4/08; H04W 76/046; H04W 64/00; H04W 88/02; H04W 8/22; H04W 76/04
See application file for complete search history.

(56) References Cited

U.S. PATENT DOCUMENTS

2011/0128911 A1* 6/2011 Shaheen ............... H04L 63/104 370/328
2011/0201343 A1 8/2011 Pinheiro et al.
(Continued)

FOREIGN PATENT DOCUMENTS

EP 2365678 A1 9/2011
EP 2369883 A1 9/2011
(Continued)

OTHER PUBLICATIONS

Interdigital Communications: "3GPP TSG SA WG2 Meeting #83; S2-110673; Triggering a detached MTC device", 3GPP Draft; S2-11073 Triggering a Detached Device Disc, 3rd Generation Partnership Project (3GPP), Mobile Competence Centre; 650, Route Des Lucioles; F-06921 Sophia-Antipolis Cedez; France vol. SA 2G2, no. Salt Lake City, Feb. 15, 2011, [retrieved on Feb. 15, 2011] all pages.

(Continued)

*Primary Examiner* — Yee Lam
(74) *Attorney, Agent, or Firm* — Lerner, Daivd, Littenberg, Krumholz & Mentlik, LLP

(57) ABSTRACT

A method for triggering a group of one or more detached wireless communication devices (122) to attach to a wireless communications network (101) for enabling data communications is disclosed. A trigger request message including a group identifier, size information for the group, and location information for the one or more wireless communication devices (122) is received (302) at the network (101). Based on this information, the network (101) determines (304) a delay time period during which the one or more wireless communication devices (122) are to transmit an access request message to the network (101) when triggered to attach to the network. The delay time period is based on the size of the group. During a trigger period, the delay time period and group identifier is transmitted (306) to the one or more wireless communication devices (122) in a trigger message. A wireless communication device (122) is also described.

20 Claims, 5 Drawing Sheets

(51) Int. Cl.
H04W 60/04 (2009.01)
H04W 8/18 (2009.01)

(56) References Cited

U.S. PATENT DOCUMENTS

| | | | |
|---|---|---|---|
| 2011/0201344 A1 | 8/2011 | Ryu et al. | |
| 2011/0244907 A1* | 10/2011 | Golaup | H04W 4/005 455/509 |
| 2013/0121303 A1* | 5/2013 | Cho | H04W 74/0833 370/329 |
| 2013/0339438 A1* | 12/2013 | Cherian | H04W 4/005 709/204 |
| 2014/0274082 A1* | 9/2014 | Huang | H04W 28/20 455/450 |

FOREIGN PATENT DOCUMENTS

| | | |
|---|---|---|
| WO | 2011084010 A2 | 7/2011 |
| WO | 2011084011 A2 | 7/2011 |

OTHER PUBLICATIONS

HTC: "3GPP TSAG SA WG2 Meeting #83; S2-110732; Evaluation of MTC Device triggering", S2-110732-PCR-Devicetriggering-V3, 3rd Generation Partnership Project (3GPP), Mobile Competence Centre; 650, Route Des Lucioles; F-06921 Sophia-Antipolis Cedez; France vol. SA WG2, no. Salt Lake City; Feb. 15, 2011, [retrieved on Feb. 15, 2011], all pages.

Interdigital Communications: "3GPP TSG SA WG2 Meeting #S5; S2-112560; Synchronisation between offline MTC devices and MTC server/3GPP core network", 3GPP Draft; S2-112560 MTC Sync Offline, 3rd Generation Partnership Project (3GPP), Mobile Competence Centre; 650, Route Des Lucioles; F-06921 Sophia-Antipolis Cedez; France vol. SA WG2, no. Xi'An; May 11, 2011, all pages.

"3rd Genration Partnership Project; Technical Specification group Services and System Aspects; System Improvements for Machine-Type Communications (Release11)", 3GPP Standard; 3GPP TR 23.888, 3rd Generation Partnership Project (3GPP), Mobile Competence Centre; 650, Route Des Lucioles; F-06921 Sophia-Antipolis Cedex; France, vol. SA WG2, No. V1.6.1, Mar. 5, 2012, all pages.

Patent Cooperation Treaty, International Search Report and Written Opinion of the International Searching Authority for International Application No. PCT/US2013/035715, Jul. 18, 2013, 20 pages.

3GPP TR 23.888 v1.4.0 (Aug. 2011), "3rd Generation Partnership Project; Technical Specification Group Services and System Aspects; System Improvements for Machine-Type Communications; (Release 11)", all pages.

3GPP TS 22.368 v11.3.0 (Sep. 2011), 3rd Generation Partnership Project; Technical Specification Group Services and System Aspects; Service requirements for Machine-Type Communications (MTC); Stage 1 (Release 11), all pages.

* cited by examiner

METHOD, APPARATUS AND SYSTEM FOR TRIGGERING WIRELESS COMMUNICATION DEVICES TO ATTACH TO A WIRELESS COMMUNICATIONS NETWORK

CROSS-REFERENCE TO RELATED APPLICATION

The present application claims the benefit of the filing date to U.S. Provisional Patent Application No. 61/622,100, filed Apr. 10, 2012, the disclosure of which is hereby incorporated herein by reference.

FIELD OF THE DISCLOSURE

The present disclosure generally relates to wireless communications, and more particularly to enabling data communications between a wireless communication network and a wireless communication device.

BACKGROUND OF THE DISCLOSURE

Machine Type Communication (MTC) devices (sometimes referred to as Machine to Machine (M2M) devices) are typically unmanned devices. Unmanned devices typically operate autonomously without a user controlling their normal operation. Unmanned devices are configured to establish communication with and exchange information with at least one server or a central network so that the server(s) or central network can provide a service to users of the MTC devices. MTC devices may include unmanned wireless devices or wireline devices that are used in applications such as status reporting, metering, parcel tracking, telematics, embedded modems for CCTV cameras and consumer electronic devices such as camcorders, cameras, and cable modems, and similar applications.

Wireless MTC devices communicate with one or more servers to exchange information by means of one or more wireless communications networks, such as cellular communications networks or other wide area communications networks. Some MTC devices are required to stay detached from the wireless communications network as long as possible, in order to, for example, conserve battery resources, reduce control signaling with the communications network and reduce the amount of device-specific information (e.g. Mobility Management (MM) context) that must be stored in the communications network. Nevertheless, recent developments in MTC service requirements made by the $3^{rd}$ Generation Partnership Project (3GPP) working group SA1 have resulted in the requirement that the wireless communications network be able to "trigger" such detached devices. For example, when a MTC server requires information from detached MTC devices, the wireless communications network should be able to trigger or force the MTC devices to attach to the wireless communications network and communicate with the MTC server.

The 3GPP working group SA1 agreed to a change request CR S1-112337 to the 3GPP specification TR 22.368 which introduces the following requirements: A MTC device shall be able to receive trigger indications from the network and shall establish communication with the MTC server when receiving the trigger indication. Possible options may include:

Receiving trigger indication when the MTC device is not attached to the network.

Receiving trigger indication when the MTC device is attached to the network but has no data connection established.

Receiving trigger indication when the MTC device is attached to the network and has a data connection established.

However, there is currently no solution specified to meet the requirement of an MTC device receiving a trigger indication when it is not attached to the network.

Currently, a wireless communication device that is detached from a communications network is not reachable by the communications network and cannot be triggered by means of downlink signalling to initiate communication with the communications network. The only possibility for a detached wireless communication device to attach to a communications network is by the device initiating communication with the network.

A known solution describes a MTC device that may configure itself to operate in a mobile-originated-only mode in which the MTC device could perform paging monitoring but not cell reselection or location update, or vice versa. The MTC device may receive a trigger from the network, such as a broadcast message or a paging message, to trigger a transition from the mobile-originated-only mode to a mobile-originated-and-terminated mode. This solution however primarily considers the case when the mobile-originated-only mode is an attached mode and only briefly discusses the mobile-originated-only mode as not being an attached mode without providing any details.

BRIEF DESCRIPTION OF THE DRAWINGS

A method and apparatus for triggering a group of one or more wireless communication devices to attach to a wireless communications network for establishing communication with a server, when the one or more wireless communication devices are not attached to a wireless communications network, will now be described in accordance with the disclosure, by way of example only, with reference to the accompanying drawings in which.

DETAILED DESCRIPTION

In the following description, example embodiments of the disclosure will be described with respect to a wireless communication device operating within a wireless communication system. The wireless communication system may include, for example, an IS-95 system, a GSM cellular communication system, a Universal Mobile Telecommunication System (UMTS), a Long Term Evolution (LTE) communication system, other wide area network communication systems, Private Mobile Radio (PMR), Worldwide Interoperability for Microwave Access (WIMAX), WLAN, other 3G or 4G networks, or the like, or any combination of such systems. In the following, the communications network will be described as a UMTS network but it will be appreciated that the disclosure may apply to any communications network and it is not intended to limit the disclosure to a UMTS network.

The wireless communication device may be any electronic device having the capability to communicate with another device in a network, such as a digital camera having a built-in modem, an embedded modem/communications device for a car, utility meters, remote health sensors, remote diagnostics apparatus, road tolling apparatus, wireless point of sales terminals, vending machines or a cable modem or similar devices. In the following description, the communication device will be referred to generally as a MTC device for illustrative purposes and it is not intended to limit the disclosure to any particular type of wireless communication device.

Figure 1:
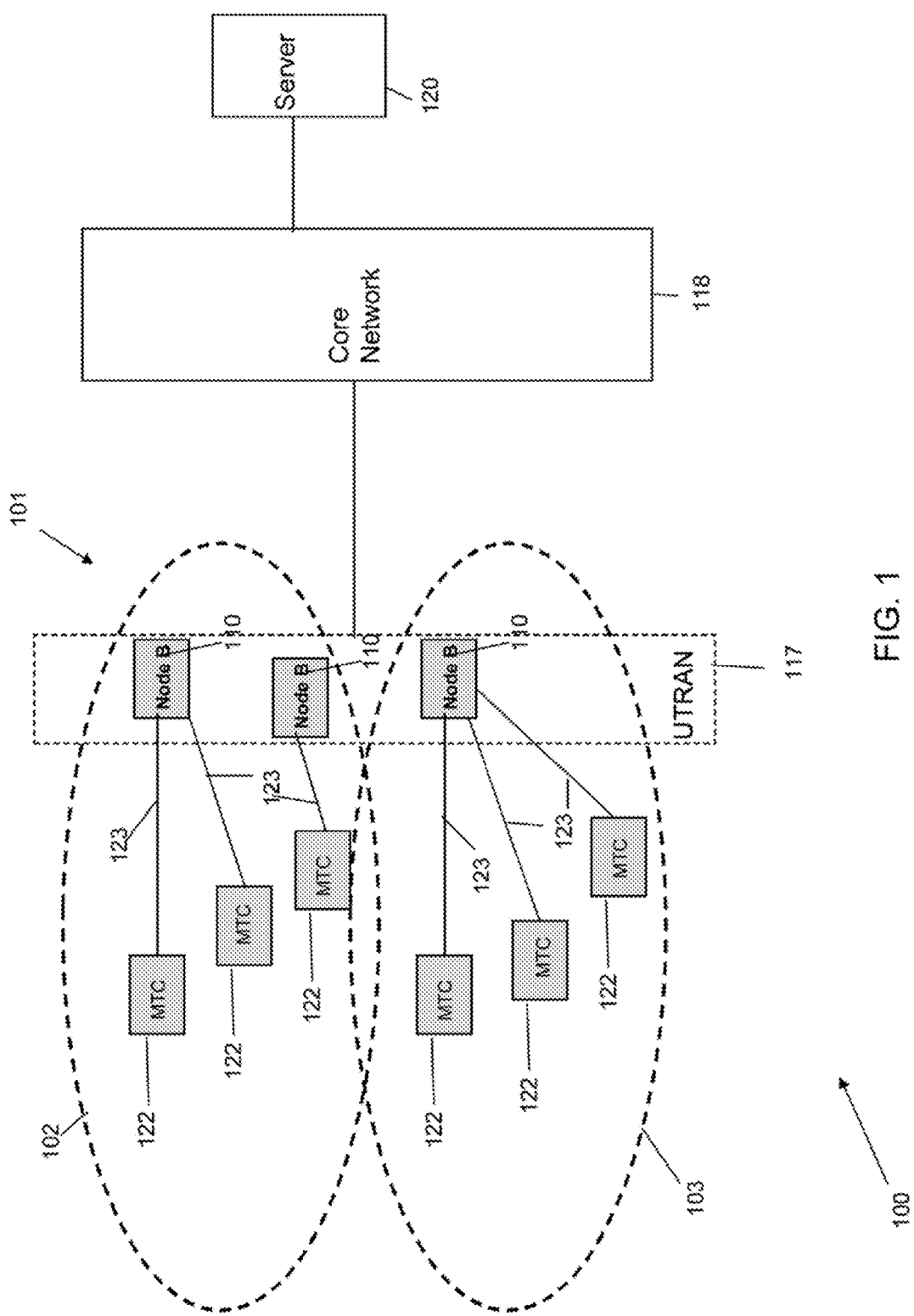
FIG. 1 is a block schematic diagram of a communication system in accordance with an example embodiment of the disclosure.

Referring firstly to FIG. 1, a communication system 100 in accordance with an example embodiment of the disclosure comprises at least one MTC device 122 (but typically a plurality of devices), capable of communicating with a wireless communications network, such as UMTS network 101.

As is well known, the UMTS network 101 provides a plurality of coverage areas or cells, such as coverage area or cells 102, 103. Each coverage area is served by one or more access nodes 110 with which the MTC devices 122 can communicate via radio communication links (such as links 123 shown in FIG. 1). The access nodes 110 may be NodeBs which are part of a UMTS Radio Access network (UTRAN) 117. The access nodes 110 may also be evolved NodeBs which are part of E-UTRAN (not shown) or any other type of similar wireless interfacing elements, such as a wireless router, which are part of a radio access network (such as GERAN, CDMA2000, WLAN, WiMAX) or a combination thereof. In the following, the access nodes 110 will be referred to as NodeBs 110 by way of example. The UTRAN 117 is communicably coupled to a core network 118. The functions of the core network 118 are well known in the art. The UMTS network 101 is communicatively coupled to a server 120, such as an MTC server, in order to provide services to users of MTC devices 122. The server 120 communicates with the core network 118 and with the MTC devices 122 via the UMTS network 101.

In an example application for a telematics system, the MTC devices 122 are wireless beacon devices transmitting traffic information to the server 120 for managing traffic information.

Figure 2:
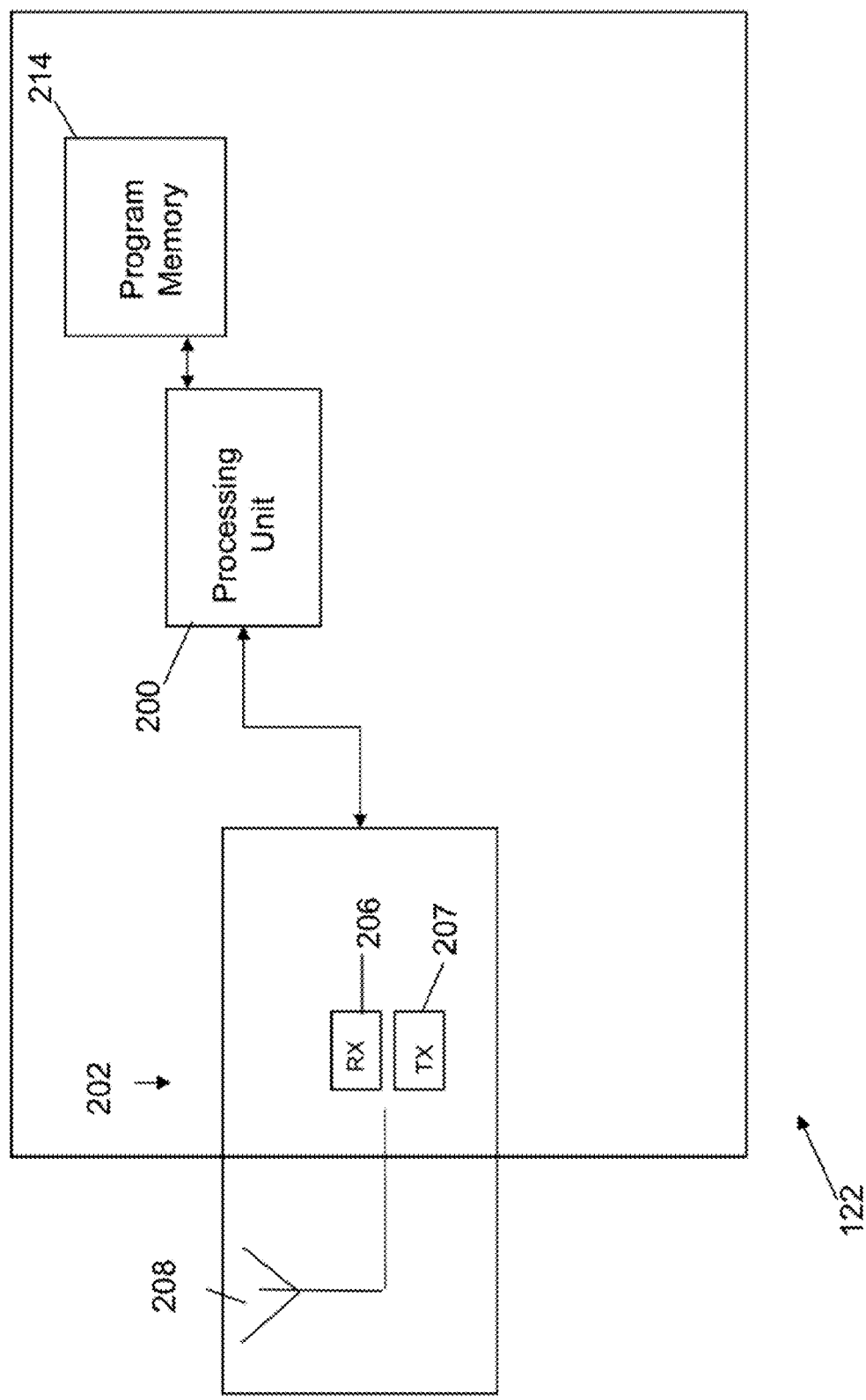
FIG. 2 is a block schematic diagram of a wireless communication device in accordance with an example embodiment of the disclosure.

FIG. 2 is a block diagram of a wireless communication device, such as the MTC device 122 shown in FIG. 1, in accordance with an example embodiment of the disclosure. As will be apparent to a person skilled in the art, FIG. 2 shows only the main functional components of an exemplary MTC device 122 that are necessary for understanding the disclosure herein.

The MTC device 122 comprises a processing unit 200 for carrying out operational processing for the MTC device 122. The MTC device 122 also has a RF communication section 202 for providing wireless communication via a radio communication link 123 with the UMTS network 101. The RF communication section 202 typically includes an antenna 208, a receiving section 206, and a transmitting section 207. Although not shown in FIG. 2 but as is well known, the receiving section 206 typically includes elements such as a receiver, demodulator, decoder, and the transmitting section 207 typically includes elements such as a transmitter, modulator, and coder. The RF communication section 202 is coupled to the processing unit 200.

The MTC device 122 may have a Man Machine Interface MMI (not shown), including elements such as a key pad, microphone, speaker, display screen, for providing an interface between the MTC device 122 and a user of the device. The MMI is also coupled to the processing unit 200.

The processing unit 200 may be a single processor or may comprise two or more processors carrying out the processing required for the operation of the MTC device 122. The number of processors and the allocation of processing functions to the processing unit is a matter of design choice for a skilled person. The MTC device 122 also has a program memory 214 in which is stored data and programs containing processor instructions for the main operation of the MTC device 122. The programs may contain a number of different program elements or sub-routines containing processor instructions for a variety of different tasks related to the main operation of the MTC device 122, for example: for processing data received at the receiving section 206, such as signalling information or signalling messages received from the UMTS network 101 (e.g. paging signals, coding and timing information) and traffic data (e.g. user data); and for processing data for transmission by the transmitting section 207.

Data is provided to the MTC device 122 for transmission. The data may be generated in the MTC device 122 or generated in another device (e.g. an external sensor or metering device) and then provided to the MTC device 122 for transmission. The data to be transmitted may include traffic data (e.g. user data such as picture information or traffic information, or data generated by sensor or metering devices (e.g. electricity metering data)). The data may additionally or alternatively include signalling information such as coding or timing information or protocol handshake messages.

Data may be transmitted by the MTC device 122 and received by the MTC device 122 via the UMTS network 101 when the MTC device 122 is attached to the UMTS network 101. The term 'attached' as used herein with reference to the example arrangement of FIG. 1 refers to a condition where a MTC device has performed the UMTS attach and (Packet Data Protocol) (PDP) Context activation procedures, which procedures are well known in the art. Thus, when the MTC device 122 is attached to the UMTS network 101, communication can be established with the server 120 and data can be exchanged between the MTC device 122 and the server 120. In order to conserve battery and reduce signalling between the MTC device 122 and the UMTS network 101 when not required to exchange data, the MTC device 122 performs a detach procedure, becomes detached from the UMTS network 101 and enters an offline mode of operation.

When detached from the UMTS network 101, the MTC device 122 does not perform any communication procedures such as paging monitoring, cell reselection, cell measuring, etc. However, the detached MTC device may monitor a broadcast channel every predetermined time period to determine whether the MTC device 122 needs to 'wake up'. In an example, the MTC device 122 monitors a predefined or specific cell broadcast channel (CBC) of the UMTS network 101 every K seconds. The predefined CBC can either be statically configured in the MTC device 122 or can be sent to the MTC device from the UMTS network 101 during a signalling procedure (e.g. when the MTC device 122 detaches from the UMTS network 101) or by Over-The-Air programming. Similarly, the time period K is configured in the MTC device 122 (e.g. at factory set up or subsequently) and stored in the program memory 214 or can be sent to the MTC device 122 from the UMTS network 101 during a signalling procedure (e.g. when the MTC device 122 detaches from the UMTS network 101) or by Over-The-Air programming. For example, a MTC device 122 in coverage area 103 of FIG. 1 monitors a predefined or specific cell broadcast channel (CBC) transmitted by the Node B 110 serving the coverage area 103 every K seconds. MTC devices 122 in coverage area 103 may monitor the same or different cell broadcast channels transmitted by the NodeB 110 serving the coverage area 103. The value of K may be different for different MTC devices 122 or the same.

When a detached MTC device 122 is to attach to the UMTS network 101, for example, when the MTC device 122 has data to send, at a specific time, or when triggered by the UMTS network 101 as indicated below in accordance with the disclosure, the MTC device 122 sends an access request message and then proceeds with the known attach and PDP Context activation procedures. The access request message may be sent over the Random Access Channel (RACH) of the UMTS network 101.

The MTC devices 122 may be arranged in groups of one or more devices. A group may include all MTC devices in a certain location or all MTC devices of a particular type and in a certain location (e.g. all electricity meters in a neighbourhood or network location area). A certain location may be a geographic location, such as a housing estate, or a network location area, such as one or more coverage areas or cells. A group may also include all or a subset of the devices of a particular service provider. For example, a group may comprise all domestic smart meter devices of an electricity provider used in an area covering a housing estate. Each group has an associated group identifier which is provided to each of the MTC devices 122 of the group. For example, the group identifier may be preconfigured in memory (such as the program memory 214) of each of the MTC devices 122 of the group in the factory or provided subsequently (e.g. by Over-The-Air programming or via signalling procedures) and stored in the program memory 214. The server 120 is also configured to know which devices are members of a particular group (e.g. which devices are members of group A) and to know the associated group identifier for the group. The value of K may be different or the same for each of the MTC devices 122 in group A. The specific or predefined CBC channel to be monitored by each of the MTC devices 122 in group A may be different or the same. For example, if all the MTC devices 122 in group A are located in the same cell served by one NodeB, the NodeB may use the same predefined CBC channel or two or more channels for all the MTC devices 122.

Figure 3:
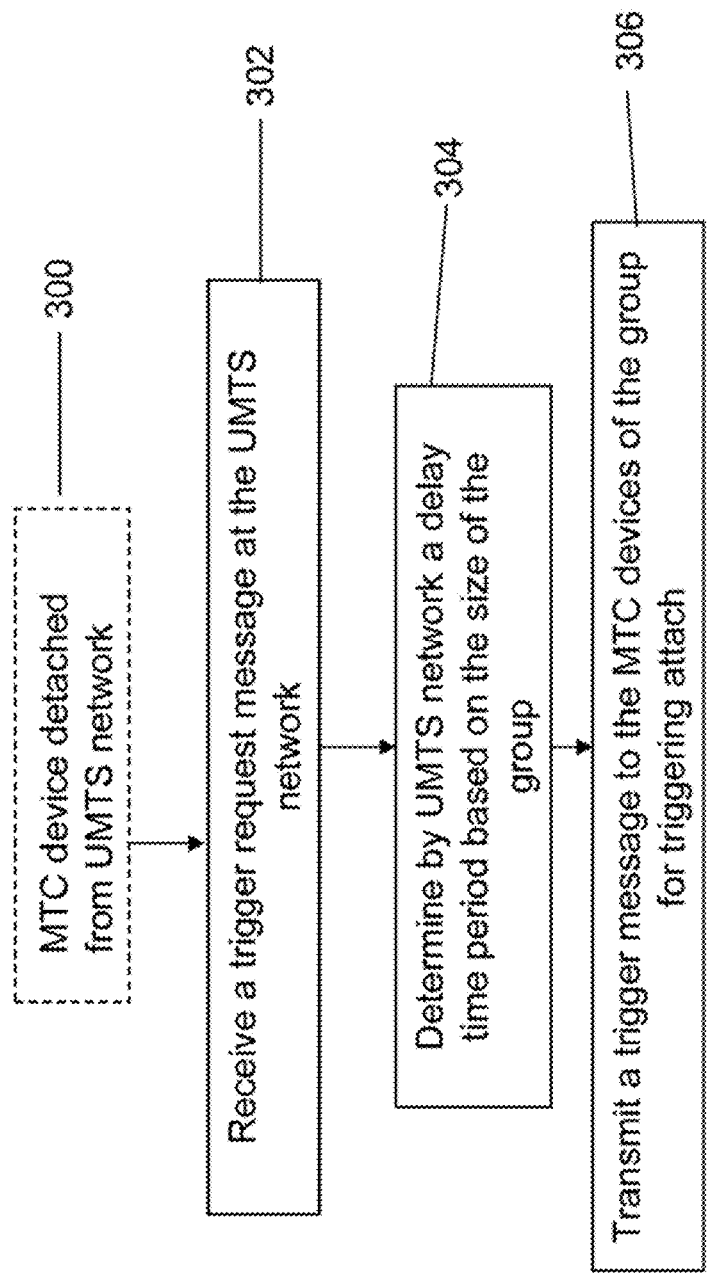
FIG. 3 is a flow diagram of an example method for triggering a group of one or more detached wireless communication devices to attach to a wireless communications network in accordance with an embodiment of the disclosure.

FIG. 3 is a flow diagram of an example method in a communications network 101 for triggering a group of one or more detached wireless communication devices 122 to attach to the wireless communications network.

The flow diagram shows example steps of the method in accordance with the disclosure.

The method may be invoked, for example, when the server 120 wishes to communicate with a group of one or more MTC devices 122, say group A, to pull measurement data from group A when the group is not attached to the network.

Group A may comprise one MTC device 122 or may comprise more than one MTC device 122 (such as, 5000 smart meter devices in a certain neighbourhood). As discussed above, Group A has an associated group identifier which has been provided to each of the MTC devices 122 of the group and stored in program memory 214 of each device. The method is described below with respect to only one MTC device 122 of group A. However, one of ordinary skill in the art will appreciate that if group A comprises more than one MTC device 122, the following method will take place for each of the MTC devices 122 of the group.

At step 300, the MTC device 122 is not attached to the communications network (such as UMTS network 101 of FIG. 1). In other words, the MTC device 122 is detached. A detached device is, for example, a device that is not attached to the communications network for General Packet Radio Service (GPRS) services or is offline; does not maintain a current mobility management and/or session management context with the communications network; and does not perform any communication procedures with the communications network. An attached device is a device that has performed an attach and PDP context activation procedure with the communications network such that the device is registered with the network, has established Internet Protocol (IP) connectivity, a mobility management context has been set up and the device is ready to initiate and accept communications.

At step 302, a trigger request message is received at the UMTS network 101. The trigger request message includes group information indicating the group identifier of group A, size information indicating a size of group A (e.g. the number of MTC devices that are members of group A) and location information indicating the location of the one or more MTC devices 122 in group A. For example, the location information may specify the geographical area or network location areas (e.g. identifier(s) of the cell(s)) where members of group A are located. The size of the group is determined when group A is established and this information is stored in the server 120. The trigger request message may be received from the server 120 and may be authenticated to confirm that the server is authentic and authorized. The trigger request message may also include a Cell Broadcast Channel (CBC) message, which is the message to be sent to the MTC devices 122 of group A.

Before becoming detached from UMTS network 101, the MTC device 122 may have provided information regarding its location to the server 120. The location information may have been provided via the UMTS network 101 as part of the detach procedure or may have been provided at another time during communication between the server 120 and the MTC device 122. The server 120 stores the location information. The location information could be the 'last' known location of the MTC device 122 before it became detached from the UMTS network 101. The location information may include an identifier of the cell (e.g. 102 or 103 of FIG. 1) in which the MTC device was located before becoming detached from the UMTS network 101. When group A comprises more than one MTC device 122, the server 120 may store location information for each of the MTC devices 122 provided before each of the MTC devices 122 became detached. In this case, the trigger request message may include location information which indicates the locations of each of the MTC devices 122 in group A. Alternatively, the location information may indicate a predefined location that is manually configured in the server 120. For example, when group A comprises MTC devices 122 that are stationary (e.g. in coverage area 103 of FIG. 1) or do not move significantly (e.g. remain in coverage area 103 of FIG. 1), then it is sufficient for the server 120 to be configured with this location information (e.g. by the server's operator). The predefined location is then provided to the UMTS network 101 in the location information included in the trigger request message.

The trigger request message may also include information indicating a trigger period based on the predefined time period (K). The trigger period is the time period during which the network sends a trigger request to the group of MTC devices. When the predetermined time period (K) is the same for all MTC devices in group A or when there is only one MTC device with predetermined time period (K), the trigger period corresponds to the predetermined time period (K). When the predetermined time period (K) is different for the MTC devices in group A (i.e. K1, K2, K3, K4 etc), the trigger period corresponds to the longest predetermined time period.

At step 304, the UMTS network 101 determines a delay time period during which the at least one or more MTC devices 122 of the group A are to transmit an access request message to the UMTS network 101 when triggered to attach to the communications network. In one example arrangement, this delay time period is determined based on the size of group A. The delay time period may be determined by a Cell Broadcast Centre or other network entity, such as a Radio Network Controller (RNC), Mobility Management Entity (MME), Serving GPRS Support Node (SGSN), NodeB, etc. In another example arrangement, the delay time period is determined based on the size of group A and the location information. This is discussed in more detail below.

At step 306, the UMTS network 101 transmits a trigger message to the one or more MTC devices 122 of group A based on the location information received at the UMTS network 101. The trigger message is for triggering the one or more MTC devices to attach to the UMTS network 101. The trigger message includes information indicating the group identifier and the delay time period. The trigger message may also include a MTC trigger indication which simply indicates that the trigger message is a MTC trigger message.

In an example arrangement, the UMTS network 101 uses the location information received in the trigger request message from the server 120 to map the locations of the one or more MTC devices 122 in group A to a least one access node of the UMTS network 101. For example, the UMTS network 101 maps the location(s) of the MTC device(s) provided by the server 120 to one or more NodeBs 110 (or routing areas, eNodeBs, BSSs) which will then be used to transmit the trigger message. Then based on this mapping, the UMTS network 101 transmits the trigger message to the MTC devices in the group A via the mapped one or more access nodes. The UMTS network 101 is configured to transmit the trigger message a number of times during the trigger period over a broadcast channel (e.g. predefined cell broadcast channel(s) (CBC) of the mapped NodeBs 110). As previously mentioned, the trigger period is determined to be the predetermined time period (K) or the longest predetermined time period (K) when there are a number of MTC devices 122 with different predetermined time periods (K1, K2, K3 etc). Thus, by transmitting the trigger message a number of times during the trigger period, it is likely that each of the one or more MTC devices 122 of group A will receive the trigger message when it monitors a broadcast channel every K (or K1, K2, K3, etc.) seconds.

Figure 4:
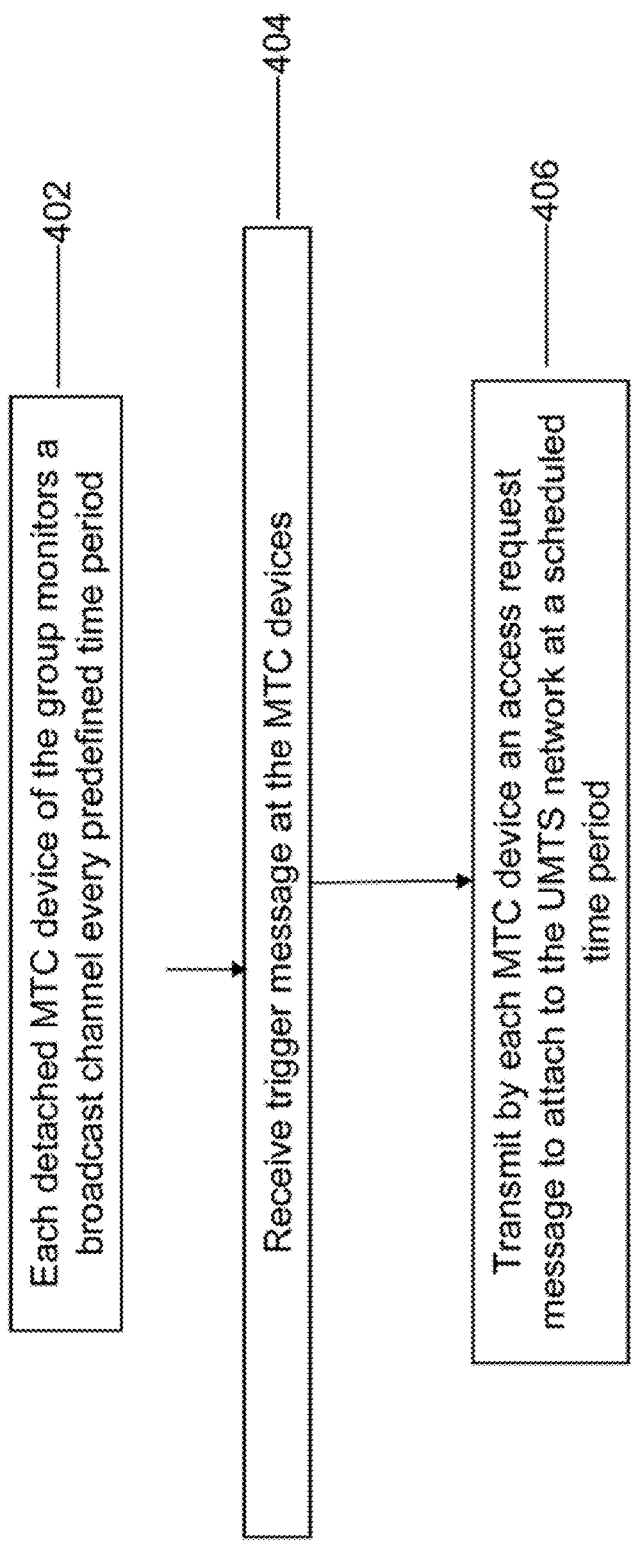
FIG. 4 is a flow diagram of an example method in a wireless communications device for attaching to a wireless communications network in accordance with an embodiment of the disclosure.

An example method in a wireless communications device for attaching to a wireless communications network in accordance with an embodiment of the disclosure will now be described in reference to FIG. 4. When a MTC device is detached from the UMTS network 101, the MTC device monitors a predefined broadcast channel every predetermined time period (K) (step 402). For group A of MTC devices, K may be the same or different for the one or more devices in the group. Information indicating the predetermined time period (K) for each of the one or more MTC devices in group A is provided to the server 120, either manually (e.g. by the server's operator) or by the MTC devices via the UMTS network 101 before they become detached from the UMTS network 101. The predetermined time period (K) may be provided by an MTC device 122 as part of the detach procedure or may be provided at another time during communication between the server 120 and the MTC device 122. As previously mentioned, when the predetermined time period (K) is the same for all MTC devices in group A or when there is only one MTC device with predetermined time period (K), the trigger period corresponds to the predetermined time period (K). When the predetermined time period (K) is different for the MTC devices in group A (i.e. K1, K2, K3, K4 etc), the trigger period corresponds to the longest predetermined time period.

At step 404, the trigger message is received at the one or more MTC devices 122 of group A (e.g. at the receiving section 206). On receiving the trigger message, the MTC device 122 compares (e.g. under the control of the processing unit 200) the group identifier included in the trigger message with the group identifier stored in the program memory 214 of the MTC device 122. If there is a match, the MTC device 122 determines that the trigger message is addressed to the MTC device 122 and forwards the message to the processing unit 200. In addition, the MTC device 122 may attempt to check the authenticity of the trigger message and confirm that it comes from a valid and trusted server. This authenticity check requires the trigger message to be protected with a sort of digital signature or equivalent means which are known in the art.

After receipt of the trigger message, at step 406, each of the one or more MTC devices 122 in group A transmits an access request message to attach to the UMTS network 101 and proceeds with the attach and PDP context activation procedures to establish communication with the server 120. If each MTC device of a large number of MTC devices tries to send an access request message (e.g. over RACH of a NodeB 110) at the same time, the resources reserved by the NodeB 110 for random accesses may be overwhelmed. In order to avoid access request messages from a plurality of MTC devices 122 being transmitted at the same time and to the same NodeB (i.e. to avoid collisions), each MTC device is configured to wait a time interval of a random length before attempting to transmit an access request message. Thus, the processing unit 200 of the MTC device 122 determines a scheduled time period for the MTC device to transmit the access request message to the UMTS network 101 to attach to the network 101. The scheduled time period is based on the delay time period provided in the trigger message. In an example arrangement, the processing unit 200 determines the scheduled time period by determining a random time period after receipt of the trigger message which is less than the delay time period. This random time period is the scheduled time period when the MTC device 122 transmits the access request message. By determining the scheduled time period based on the delay time period which is dependent on the group size, radio resource requirements for access by groups of MTC devices (e.g. RACH resource needs) can be varied dynamically according to actual need, and collisions of transmitted access request messages can be minimised even for a group with a large number of MTC devices. For example, a larger sized group will need more time than a smaller sized group to transmit access request messages with a negligible number of collisions.

In an example arrangement, the UMTS network 101 uses the location information to map the one or more MTC devices 122 in group A to at least one access node of the communications network (e.g. NodeB 110 of the UMTS network 101) and then determines for each of the mapped access nodes, the number of MTC devices 122 to be served by the mapped access node. The UMTS network 101 then determines the delay time period for each mapped access node based on the determined number of MTC devices to be served by the mapped access node. Each of the MTC devices 122 uses the determined delay time period of its mapped access node to determine the scheduled time period when it is to transmit an access request message. Thus, in this example arrangement, the number of MTC devices of group A being served by a particular NodeB can be taken into account when determining the delay time period. Since the availability of the RACH is per NodeB, by considering the number of MTC devices served by a NodeB when determining the delay time period, the timing of access request messages from a plurality of MTC devices can be controlled per NodeB. The delay time period for a NodeB serving a large number of MTC devices will be greater than the delay period for a NodeB serving a small number of MTC devices so as to reduce the chances of a collision of access request messages as well as to reduce the chances of a high number of access request messages in a short time period (high access rate).

The number of MTC devices in a group to be served by each access node may be estimated. To estimate the number, the UMTS network 101 may use the location of the MTC devices to determine the number of access nodes that are to serve the group of MTC devices and may then estimate the number of MTC devices per access node by dividing the size of the group by the determined number of access nodes. Alternatively, the UMTS network 101 may determine a more accurate number of MTC devices per access node using, for example, location information (e.g. cell ID information) for each MTC device which indicates the cell in which the MTC device was located. The cell ID information for a MTC device is typically provided to the server 120 before the MTC device detaches from the UMTS network 101.

Using just the size of the group A to determine the delay time period is simpler than determining the delay time period per access node and may be sufficient to reduce collisions and peak access rate to a negligible amount without the need to determine the delay time period per access node.

Figure 5:
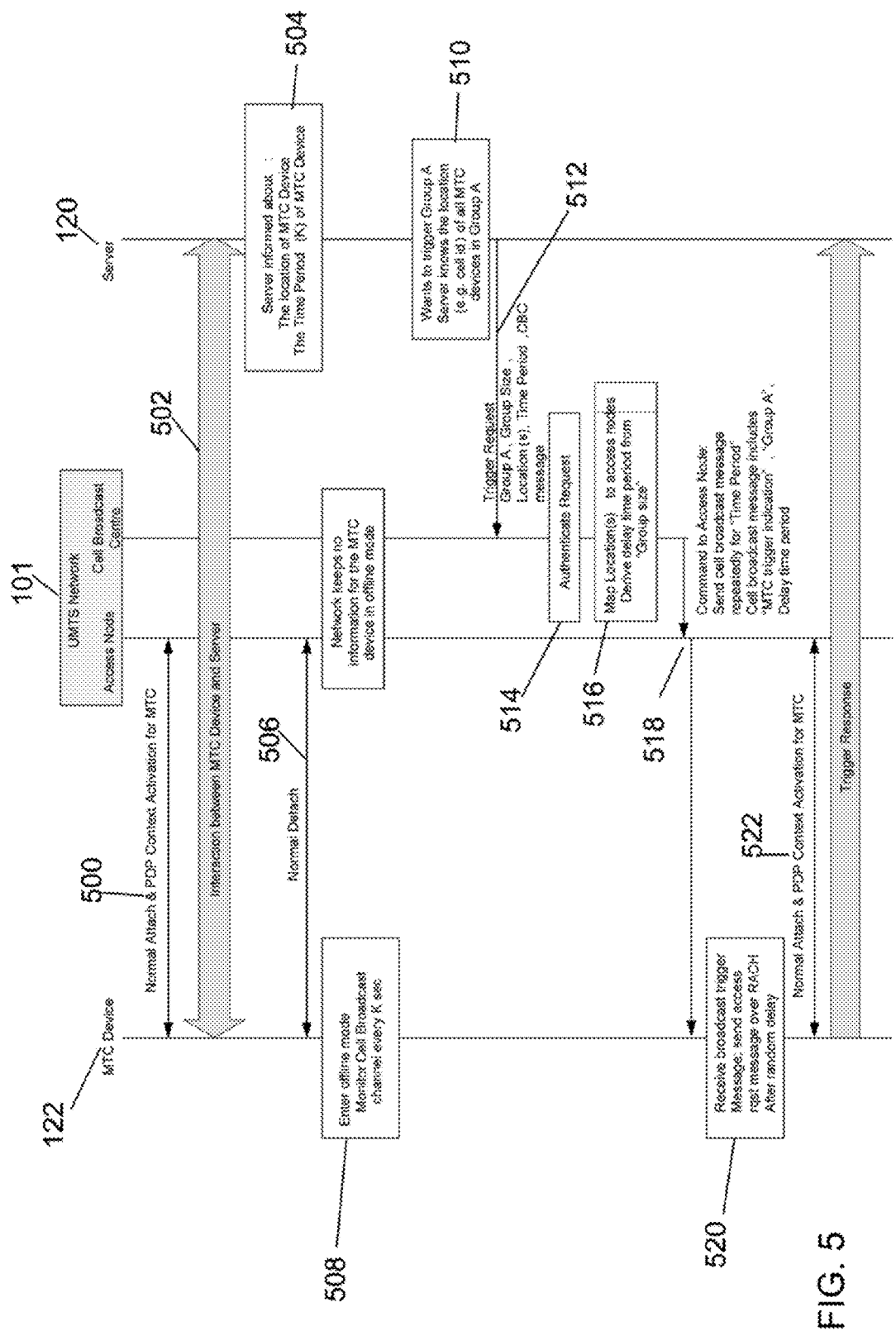
FIG. 5 is a diagram showing an example message flow for triggering a group of one or more detached wireless communication devices to attach to a wireless communications network in accordance with an embodiment of the disclosure.

Additional details of the disclosure may be understood from FIG. 5 which shows an example message flow for triggering a group of one or more detached wireless communication devices, such as MTC devices 122 of FIG. 1, to attach to a wireless communications network, such as UMTS network 101 of FIG. 1, in accordance with an embodiment of the disclosure. The message flow will be described below with respect to only one MTC device 122 of group A. The UMTS network 101 in FIG. 5 includes one or more access nodes (e.g. NodeBs) and one Cell Broadcast Centre, which is a known component of the cell broadcast service in UMTS.

At step 500, the MTC device 122 performs an attach procedure with the UMTS network 101 and activates a PDP context as is well known in the art. Communication between the MTC device 122 and the server 120 occurs in step 502. During communication between the server 120 and the MTC device 122 and before the MTC device 122 becomes detached from the UMTS network 101, information about the location of the MTC device 122 and the predefined time period (K) is provided to the server 120 (step 504). At step 506, the MTC device 122 performs a detach procedure to conserve battery and reduce signalling as well as context storage requirements in the UMTS network 101. The MTC device 122 is detached and is in an offline mode at step 508. When detached, the MTC device 122 monitors a predefined broadcast channel (e.g. CBC) every K seconds. The UMTS network 101 does not keep information for the MTC device 122 while in offline mode. At step 510, the server 120 wants to communicate with the one or more MTC devices 122 in group A. The server 120 has received or has been configured with the location (e.g. the cell ID) of each of the one or more MTC devices in group A. At step 512, the server 120 sends a trigger request message to the Cell Broadcast Centre of the UMTS network 101. The trigger request message includes a group identifier for group A, the size of group A and location information of the one or more MTC devices 122 in group A. The trigger request message may also include the predetermined time period(s) (K or K1, K2, K3 etc) for each of the MTC devices 122 in group A. At step 514, the UMTS network 101 authenticates the server 120 to verify that the server 120 is authorized to send the trigger request message. At step 516, the UMTS network 101 (e.g. the Cell Broadcast Centre or another entity in the network) maps the location(s) of the MTC device(s) provided by the server 120 to one or more access nodes (e.g. NodeBs 110 in UMTS or eNodeBs in LTE) which will then be used by the access nodes to transmit the trigger message. The UMTS network 101 also determines a delay time period, based on the size of group A, during which the at least one or more MTC devices 122 of the group A are to transmit an access request message to the UMTS network 101 when triggered to attach to the UMTS network 101. The determination of the delay time period may be determined for each NodeB 110 based on the number of MTC devices 122 which are served by the NodeB 110 as discussed above. At step 518, the UMTS network 101 sends a command to the mapped access node(s) to send a trigger message on a broadcast channel based on the predefined time period (K or the longest of K1, K2, K3 etc). This command may not be sent directly to a mapped access node. For example, in UMTS, the command will be sent to one or more RNCs which will forward it to the mapped NodeBs. In LTE on the other hand, the command can be sent directly to the mapped eNodeBs.

The trigger message includes the group identifier, the delay time period and a MTC trigger indication. Other information may also be included in the trigger message, such as, information indicating to the MTC device 122 the type of actions that need to be taken, and the identity of the server with which communication is to be established. At step 520, the MTC device 122 receives the broadcast trigger message and sends an access request message over the RACH after a random delay between 0 and the delay time period. At step 522, the MTC device 122 performs an attach procedure with the UMTS network 101 so as to establish a connection with the server 120.

In summary, the present disclosure provides a mechanism by which a communications network can trigger a group of one or more detached wireless communication devices to attach to a communications network. Furthermore, the present disclosure provides a trigger mechanism initiated by the network which has a load control mechanism that ensures that when the one or more detached wireless communication devices are triggered to send an access request message to the communications network, the rate of access requests (or the network load) is reduced and collisions are avoided or substantially reduced by using a delay time period. The delay time period is determined by the wireless communications network based on the size of the group and is sent to the wireless communication devices as part of the trigger message. Determining the delay time period based on the size of the group of devices provides a simple solution to minimise collisions.

As an alternative to determining the delay time period based only on the size of the group of devices, the delay time period may be calculated per access node of the wireless communications network based on how many wireless communication devices are mapped to the same access node. Since the RACH availability is per access node, considering the number of wireless communication devices served by a particular access node can significantly reduce the rate of access requests (thus the network load) and the number of collisions of access request messages.

In the foregoing description, the invention has been described with reference to specific examples of embodiments of the invention. It will, however, be evident that various modifications and changes may be made therein without departing from the broader scope of the invention as set forth in the appended claims.

Some of the above embodiments, as applicable, may be implemented using a variety of different processing systems. For example, the Figures and the discussion thereof describe an exemplary architecture which is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between program and system/device elements are merely illustrative and that alternative embodiments may merge elements or impose an alternate decomposition of functionality upon various elements.

The invention claimed is:

1. A method for triggering a group of one or more wireless communication devices to attach to a wireless communications network for enabling data communications, when the group of one or more wireless communication devices are not attached to the wireless communications network, the group of one or more wireless communication devices having a group identifier associated therewith, the method comprising:

receiving at the wireless communications network a trigger request message, the trigger request message including information indicating the group identifier, information indicating a size of the group of one or more wireless communication devices, information indicating a trigger period based on a predetermined time period, and information indicating a location of one or more wireless communication devices of the group;

determining by the wireless communications network a delay time period during which the one or more wireless communication devices of the group are to transmit an access request message to the wireless communications network when triggered to attach to the wireless communications network, wherein the delay time period is based on the size of the group of one or more wireless communication devices; and transmitting, by the wireless communications network to the one or more wireless communication devices of the group, based on the information indicating the location of the one or more wireless communication devices of the group received at the wireless communications network, a trigger message for triggering the one or more wireless communication devices of the group to attach to the wireless communications network, the trigger message including the information indicating the group identifier, and the delay time period, wherein the wireless communications network transmits the trigger message on a broadcast channel during the trigger period.

2. The method of claim 1, wherein the predetermined time period is provided to each wireless communication device in the group of one or more wireless communication devices by the wireless communications network.

3. The method of claim 1, wherein the predetermined time period of at least one of the one or more wireless communication devices in the group of one or more wireless communication devices is different than another predetermined time period of at least one other of the one or more wireless communication devices in the group of one or more wireless communication devices, and wherein the trigger period corresponds to a longest predetermined time period of the one or more wireless communication devices in the group of one or more wireless communication devices.

4. The method of claim 1, further comprising on receiving the trigger message at one of the one or more wireless communication devices in the group, comparing by the one of the wireless communication devices the group identifier included in the trigger message with the group identifier associated with the one of the wireless communication devices and transmitting the access request message by the one of the wireless communication devices in response to the comparing step.

5. The method of claim 1, further comprising determining by each of the one or more wireless communication devices of the group a scheduled time period for transmitting the access request message by determining a random time period after receipt of the trigger message which is less than the delay time period.

6. The method of claim 1, further comprising using the information indicating the location of the one or more wireless communication devices of the group to map the one or more wireless communication devices of the group to at least one access node of the wireless communications network and wherein transmitting the trigger message includes transmitting the trigger message to the one or more wireless communication devices of the group by the at least one access node.

7. The method of claim 1, further comprising:

using the information indicating the location of the one or more wireless communication devices of the group to map the one or more wireless communication devices of the group to at least one access node of the wireless communications network;

determining for each of the mapped access nodes, a number of the one or more wireless communication devices of the group to be served by the mapped access node; and determining the delay time period for each mapped access node based on the determined number of the one or more wireless communication devices of the group to be served by the mapped access node, each of the one or more wireless communication devices of the group using the determined delay time period of the mapped access node of the wireless communication device to determine the scheduled time period.

8. The method of claim 1, wherein the trigger request message is received from a server for enabling data communications between the server and the one or more wireless communication devices of the group.

9. The method of claim 8, wherein the server is provided with the group identifier, the size of the group of one or more wireless communication devices, the location of the one or more wireless communication devices of the group, and the predetermined time period prior to the server sending the trigger request message.

10. A wireless communication device, the wireless communication device being in a group of one or more wireless communication devices, the group of one or more wireless communication devices having a group identifier associated therewith, the wireless communication device comprising:
 a transmitter configured to transmit data;
 a receiver configured to receive data;
 memory coupled to the transmitter and receiver for storing the group identifier of the group of one or more wireless communication devices; and
 a processor coupled to the transmitter, the receiver and the memory, the processor configured to:
 monitor a broadcast channel every predetermined time period, when the wireless communication device is not attached to a wireless communications network;
 receive a trigger message transmitted by the wireless communications network on the broadcast channel, the trigger message including information indicating the group identifier, and a delay time period, the delay time period being based on a size of the group of the one or more wireless communication devices and defining a period during which one or more wireless communication devices of the group are to transmit an access request message to the wireless communications network when triggered to attach to the wireless communications network; and
 transmit the access request message in response to receiving the trigger message for attaching to the wireless communications network.

11. The wireless communication device of claim 10, wherein before transmitting the access request message, the processor is further configured to compare the group identifier included in the trigger message with the group identifier stored in the memory and to transmit the access request message only when there is a match.

12. The wireless communication device of claim 10, wherein before transmitting the access request message, the processor is further configured to determine a scheduled time period for transmitting the access request message by determining a random time period after receipt of the trigger message which is less than the delay time period.

13. A communication system comprising a wireless communications network and a group of one or more wireless communication devices, the group of one or more wireless communication devices having a group identifier associated therewith,
 each of the wireless communication devices in the group of one or more wireless communication devices being capable of communicating with the wireless communications network and comprising:
 a transmitter configured to transmit data;
 a receiver configured to receive data;
 memory for storing the group identifier of the group of one or more wireless communication devices; and
 a processor communicably coupled to the transmitter, the receiver and the memory, the processor being configured to:
 monitor a broadcast channel every predetermined time period, when the wireless communication device is not attached to the wireless communications network;
 the wireless communications network being configured to:
 receive a trigger request message, the trigger request message including information indicating the group identifier, information indicating a size of the group of one or more wireless communication devices, information indicating a trigger period based on a predetermined time period of one or more wireless communication devices of the group, and information indicating a location of one or more wireless communication devices of the group;
 determine a delay time period during which the one or more wireless communication devices of the group are to transmit an access request message to the wireless communications network when triggered to attach to the wireless communications network, wherein the delay time period is based on the size of the group of one or more wireless communication devices; and
 transmit to the one or more wireless communication devices of the group, based on the information indicating the location of the one or more wireless communication devices of the group received at the wireless communications network, a trigger message for triggering the one or more wireless communication devices of the group to attach to the wireless communications network, the trigger message including the information indicating the group identifier, and the delay time period, wherein the wireless communications network transmits the trigger message on the broadcast channel during the trigger period;
 wherein the processor of each of the one or more wireless communication devices of the group is further configured to:
 receive the trigger message; and
 transmit the access request message in response to receiving the trigger message for attaching to the wireless communications network.

14. The communication system of claim 13, wherein the predetermined time period of at least one of the one or more wireless communication devices in the group of one or more wireless communication devices is different from another predetermined time period of at least one other of the one or more wireless communication devices in the group of one or more wireless communication devices, and wherein the trigger period corresponds to a longest predetermined time period of the one or more wireless communication devices in the group of one or more wireless communication devices.

15. The communication system of claim 13, wherein the processor of each of the one or more wireless communication devices in the group of one or more wireless communication devices is further configured to compare the group identifier included in the trigger message with the group identifier stored in the memory and to transmit the access request message in response to the comparison.

16. The communication system of claim 13, wherein the processor of each of the one or more wireless communication devices in the group of one or more wireless communication devices is further configured to determine a scheduled time period for transmitting an access request message by determining a random time period after receipt of the trigger message which is less than the delay time period.

17. The communication system of claim 13, wherein the wireless communications network is further configured to use the information indicating the location of the one or more wireless communication devices of the group to map the one or more wireless communication devices of the group to at least one access node of the wireless communications network and wherein the wireless communications network is configured to transmit the trigger message to the one or more wireless communication devices of the group by the at least one access node.

18. The communication system of claim 13, wherein the wireless communications network is further configured to:
  use the information indicating the location of the one or more wireless communication devices of the group to map the one or more wireless communication devices of the group to at least one access node of the wireless communications network;
  determine for each of the mapped access nodes, a number of the one or more wireless communication devices of the group to be served by the mapped access node; and
  determine the delay time period for each mapped access node based on the determined number of the one or more wireless communication devices of the group to be served by the mapped access node, each of the one or more wireless communication devices of the group using the determined delay time period of the mapped access node of the wireless communication device to determine a scheduled time period.

19. The communication system of claim 13, wherein the wireless communications network is configured to receive the trigger request message from a server, the trigger request message for enabling data communications between the server and the one or more wireless communication devices of the group via the wireless communications network.

20. The communication system of claim 13, further comprising a server communicably coupled to the wireless communications network,
  wherein the wireless communications network is configured to receive the trigger request message from the server, the trigger request message for enabling data communications between the server and the one or more wireless communication devices of the group via the wireless communications network, and
  wherein the server is provided with the group identifier, the size of the group of one or more wireless communication devices, and the information indicating the location of the one or more wireless communication devices of the group.

* * * * *